Dec. 8, 1953 — J. A. CLYDE — 2,661,639
COLLAPSIBLE BORING TOOL
Filed July 25, 1951 — 2 Sheets-Sheet 1
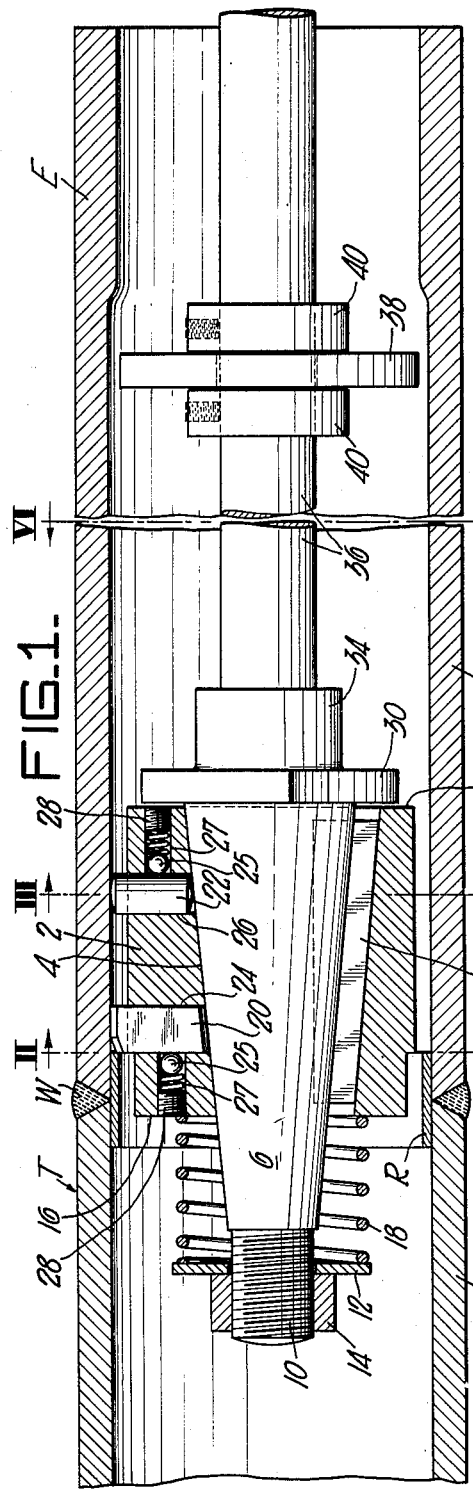
Inventor:
JOHN A. CLYDE,
by: Donald G. Dalton
his Attorney.

Dec. 8, 1953 J. A. CLYDE 2,661,639
COLLAPSIBLE BORING TOOL
Filed July 25, 1951 2 Sheets-Sheet 2
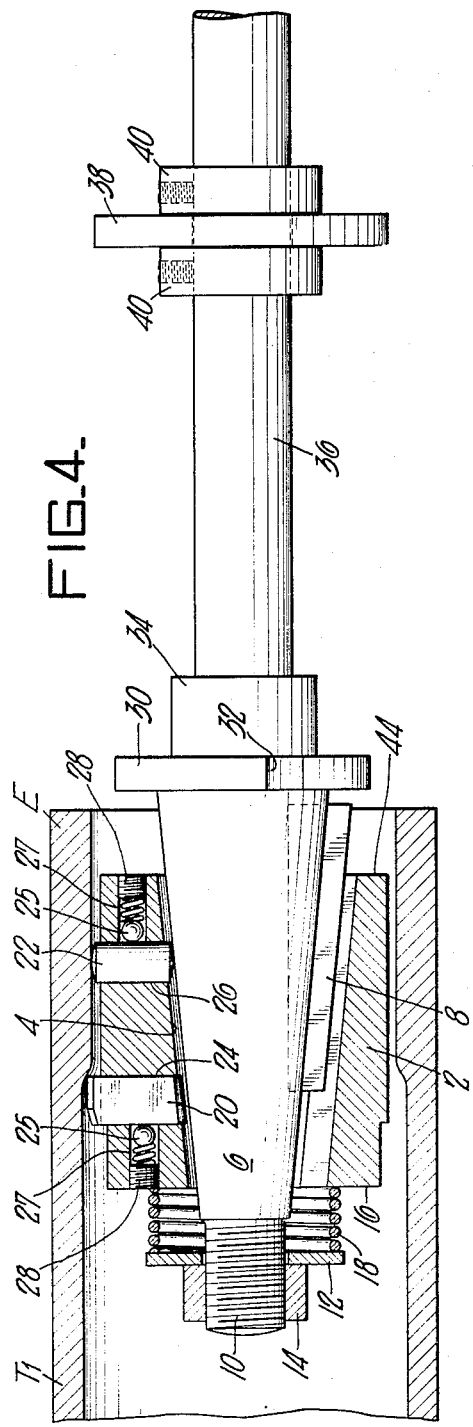
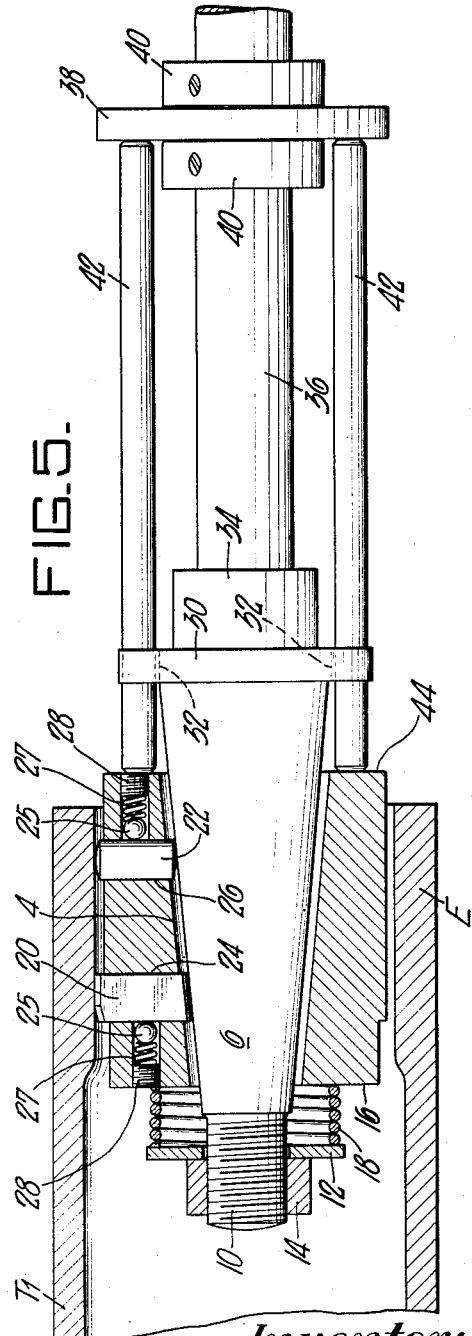
Inventor:
JOHN A. CLYDE,
by: Donald G. Dalton
his Attorney.

Patented Dec. 8, 1953

2,661,639

UNITED STATES PATENT OFFICE 2,661,639

COLLAPSIBLE BORING TOOL

John A. Clyde, Ellwood City, Pa., assignor to United States Steel Corporation, a corporation of New Jersey Application July 25, 1951, Serial No. 238,457

4 Claims. (Cl. 77—58)

This invention relates to a boring tool and more particularly to a collapsible boring tool adapted to machining the interior of long lengths of tubing, oil well casing and the like.

Because of limitations in rolling equipment, long lengths of tubing, pipe and the like are commonly made by welding two or more rolled sections end to end. The welding operation can be greatly facilitated by the use of a welding ring inserted in the tubes at the joint. However, upon completion of the welding this ring must be removed in order to obtain a tube of uniform internal diameter. The removal of the ring is complicated by the fact that the tubes are internally upset at their ends to thicken and strengthen the walls at these points, thus any tool must enter and leave through a restricted end opening, and must expand to the interior diameter of the tube when past the end-restriction. The degree of expansion must be controllable, otherwise excessive and localized removal of the metal will occur which weakens the tube.

Accordingly it is an object of the present invention to provide a boring tool which can be collapsed to pass through the restricted end-opening of an internally upset tube and can then be automatically expanded to the exact internal diameter of the main portion of the tube whereby a temporary welding collar or like obstruction can be removed and a tube of uniform internal diameter achieved.

This and other objects will become apparent from the following specification when read in conjunction with the attached drawings in which:

Figure 1 is a longitudinal section through a length of tube showing the tool in working position at the start of the boring operation, certain elements of the tool being shown in section for clarity;

Figure 2 is a cross-section taken along the line II—II of Figure 1;

Figure 3 is a cross-section along the line III—III of Figure 1;

Figure 4 is a longitudinal section through a tube at the internally upset end thereof, showing the tool being collapsed as it is removed from the tube;

Figure 5 is similar to Figure 4 but shows the tool held in collapsed position during entry into the tube through the internally upset end thereof; and Figure 6 is a cross-section taken along the line VI—VI of Figure 1.

With particular reference to the drawings, the reference letter T indicates a long length of tubing formed by welding two sections, T-1 and T-2 respectively, end to end at W. The temporary welding-ring used in the joining operation is indicated by the letter R. As indicated at E, the ends of tube T are internally upset to thicken and strengthen the walls at these portions which will ultimately be threaded. This thickening constricts the end opening through which the boring tool of the present invention is inserted and withdrawn. It will be understood that known apparatus is provided for gripping and rotating tube T, for supporting it during the boring operation and for advancing and retracting the boring tool. Such apparatus is conventional and therefore has not been shown in the drawings.

The boring tool of the present invention comprises a tool-holding housing or head 2 of generally cylindrical shape and having a central, axially extending tapered bore 4 by means of which it is slidably and coaxially mounted on a conical plug 6, rotation of head 2 with respect to plug 6 being prevented by a key 8. The plug 6 is provided at its smaller end with a threaded cylindrical portion 10 which carries a spring-retainer washer 12 held in place by a nut 14. Mounted between the washer 12 and the forward face 16 of head 2 is a compression spring 18 which resiliently urges the head backwardly on plug 6 toward the large end thereof.

Cutter elements 20 and guide or stop-pins 22 are slidably disposed in holes 24 and 26, respectively. The holes 24 are preferably square to prevent cutters 20 from turning and are equally spaced about the circumference toward the forward end of head 2. Holes 26 are similarly arranged but located toward the rearward end of the head. Both series of holes extend radially and communicate with bore 4 so that the interior ends of the cutter elements and stop-pins bear on plug 6. In such an arrangement, the action of spring 18 is to force the cutters and stop-pins outwardly into contact with the walls of the tube T, the lengths of cutters 20 and pins 22 being chosen as dictated by their respective positions on plug 6, the taper thereof, and the tube diameter, so that they contact the tube walls simultaneously.

Stop-pins 22 are preferably bronze and serve to keep the boring head in alignment and to limit the extension of the cutters 20 and thus the diameter of the bore made by the cutters is limited to the diameter of the tube at the point of contact of the stop-pins so that only the welding ring R will be removed. The cutters and stop-pins are frictionally restrained in their respective guide holes by spring-loaded balls 25 disposed in holes 27 drilled through the faces of the head 2. The pressure exerted by balls 25 can be varied by adjusting retaining screws 28. This arrangement prevents the cutters and pins from falling out when the tool is removed from the tube.

Conical plug 6 is provided at its large end with an integral collar 30 having two oppositely disposed slots 32 formed in the edges thereof, and a hub portion 34 which is internally threaded for attachment to a support bar 36. The latter extends outside the tube and is clamped or otherwise fastened in a feed-mechanism, not shown, which advances and retracts the tool longitudinally of the tube as required. Because of the extreme length of bar 36, stiffening discs 38 are rotatably mounted by means of set-screw collars 40 at intervals of about six feet along the bar. The discs 38 are of slightly smaller diameter than the internally upset portion E of the tube and while they will not entirely eliminate sagging of bar 36, they will keep it within satisfactory operating limits.

As shown in Figure 5 rods 42 are provided which can be positioned between the rearward face 44 of head 2 and the forward face of the adjacent stiffening disc 38 to maintain the tool in collapsed position for entry into the tube. Rods 42 are receivable in and are held in place by the slots 32 in the collar 30. The rods may be inserted by forcing the head 2 forwardly against spring 12. After the collapsed tool has been advanced past the restricted end E of tube T, the rods 42 are removed by grasping them near their ends adjacent the disc 38 and pulling away from the center-line of the tool.

Upon removal of rods 42, spring 12 forces head 2 backwardly on plug 6 to extend cutters 20 and stop-pins 22 into contact with the tube walls as previously described and bar 36 is advanced manually until the edges of cutters 20 contact the welding ring R as shown in Figure 1. The operator then sets the lathe-head in motion to rotate the tube and clamps bar 36 in the lathe feed mechanism. During the boring operation pressure exerted by the feed mechanism maintains head 2 in proper position on plug 6. For this reason, spring 18 need only be sufficiently strong to cause initial expansion of the tool. This fact contributes to the ease with which the tool is collapsed as it is withdrawn.

The collapsing action is illustrated in Figure 4. As the tool is withdrawn, pins 22 strike the constricted portion E of the tube T retarding the movement of head 2 but permitting plug 6 to continue to move and compress spring 18. As this action continues the sloping portion of the internal-upset acts as a cam to force the pins 22, and in their turn, cutters 20, inwardly in head 2. Rods 42 may be positioned at this time to maintain the tool in collapsed position or the tool can be completely withdrawn and the rods inserted as previously described.

The tool may be provided with sets of cutters and stop-pins of various lengths and with stiffening discs of various diameters to accommodate it to tubes of different diameters. Moderate diameter variations are met without change of cutters and stop-pins since the position head 2 takes on plug 6 is limited by contact of pins 22 with the tube walls.

While I have shown and described one specific embodiment of my invention I do not wish to be limited exactly thereto except as defined by the scope of the appended claims.

I claim:

1. A boring tool comprising a generally cylindrical head having a tapered bore axially therethrough and two series of circumferentially spaced holes extending radially therethrough, the first of said series of circumferentially spaced holes being located toward the forward end of the head, the second series toward the rearward end thereof, a bar disposed coaxially of said head and having a conical plug thereon extending through said bore and keyed thereto, a compression spring on said plug constantly urging said head backwardly thereon, cutters slidable in one of the aforementioned series of radial holes and bearing on said plug at their inner ends, and stop pins slidable in the other series of radial holes adapted to engage said plug at their inner ends and the walls of a bore in a workpiece at their outer ends to limit the axial movement of said head on said plug and the outward movement on said cutters.

2. The boring tool of claim 1 including yieldable means frictionally engaging said cutters and stop-pins to frictionally retain them in their respective radial holes.

3. A boring tool comprising a generally cylindrical head having a tapered bore axially therethrough and a series of circumferentially spaced holes extending radially therethrough and toward the forward end thereof, a bar disposed coaxially of said head and having a conical plug thereon extending through said bore and keyed thereto, a compression spring on said plug constantly urging said head backwardly thereon, cutters slidable in said radial holes and bearing on said plug at their inner ends, a second series of circumferentially spaced radial holes through said head toward the rearward end thereof, and stop-pins slidable in said last mentioned holes adapted to engage said plug at their inner ends and the walls of a bore in a workpiece at their outer ends to limit the axial movement of said head on said plug and the resulting outward movement of said cutters.

4. The boring tool of claim 3 including yieldable means frictionally engaging said cutters and stop-pins to retain them in their respective radial holes.

JOHN A. CLYDE.

References Cited in the file of this patent

UNITED STATES PATENTS

| Number | Name | Date |
| --- | --- | --- |
| 892,585 | Feagler | July 7, 1908 |
| 1,286,515 | Boman | Dec. 3, 1918 |
| 2,350,778 | Lang | June 6, 1944 |